UNITED STATES PATENT OFFICE.

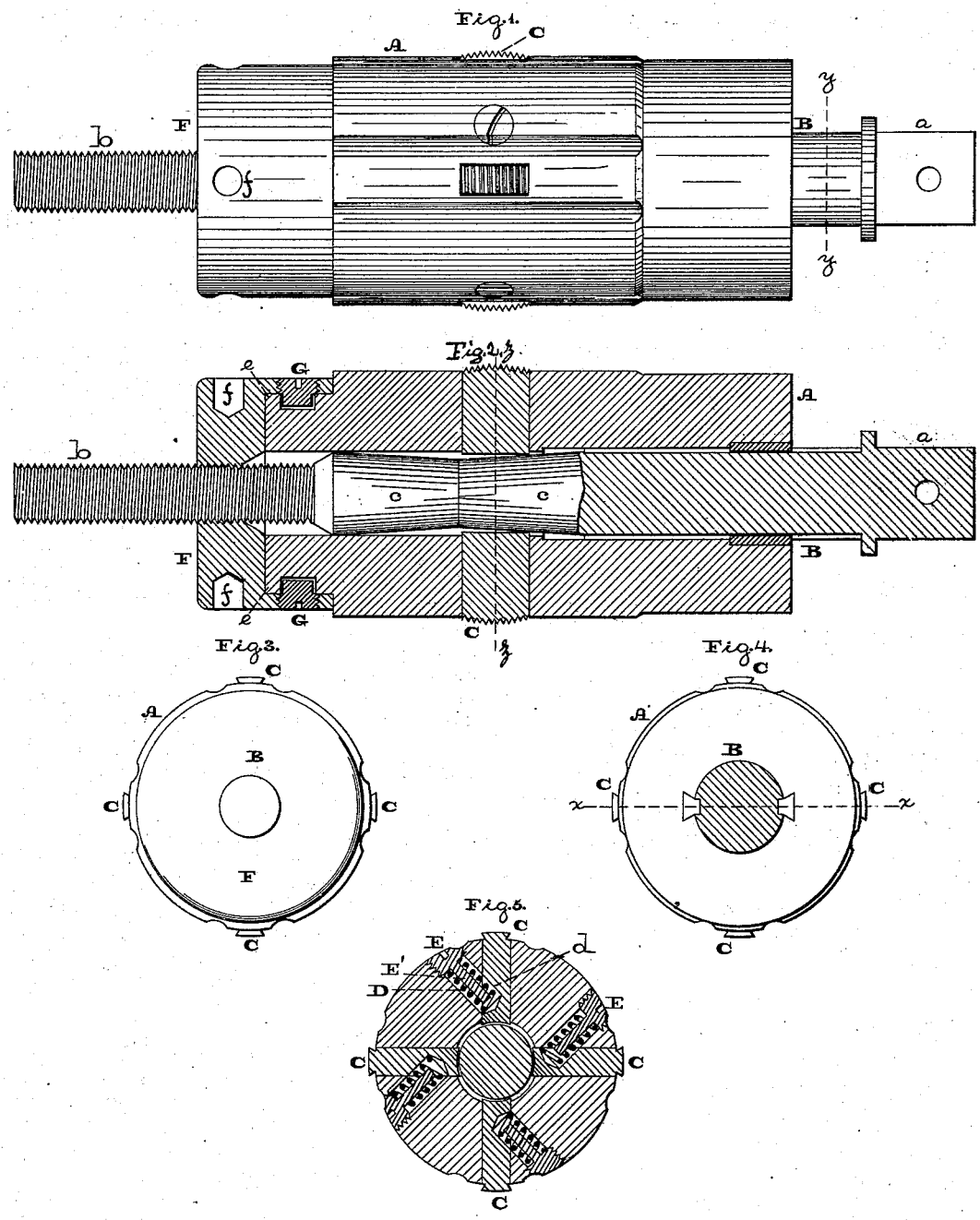

BENJAMIN STOTT, OF SOUTH CHESTER, PENNSYLVANIA, ASSIGNOR TO CHESTER TUBE AND IRON COMPANY, OF SAME PLACE.

IMPROVEMENT IN SCREW-CUTTING TAPS.

Specification forming part of Letters Patent No. 216,909, dated June 24, 1879; application filed February 12, 1879.

*To all whom it may concern:*

Be it known that I, BENJAMIN STOTT, of South Chester, in the county of Delaware and State of Pennsylvania, have invented a new and useful Improvement in Taps for Cutting Threads with tapering, cylindrical, and variable surfaces, which improvement is fully set forth in the following specification and accompanying drawings, in which—

Figure 1 is a side elevation of the tap embodying my invention. Fig. 2 is a central longitudinal section thereof in line $xx$, Fig. 4. Fig. 3 is an end view thereof. Fig. 4 is a transverse section in line $yy$, Fig. 1. Fig. 5 is a transverse section in line $zz$, Fig. 2.

Similar letters of reference indicate corresponding parts in the several figures.

My invention consists of a spindle provided with tapering surfaces and a threaded portion, in combination with a chuck, taps, and a swiveled nut, whereby the taps or screw-cutters of the chuck are caused to advance or recede or follow the contour of said surfaces as the chuck travels, and thus thread the inner face of a socket or other hollow body in tapering diameter.

Referring to the drawings, A represents a chuck or stock having a central longitudinal opening, in which is fitted by a spline or feather connection a spindle, B, whereby the chuck rotates with said spindle and also moves longitudinally thereon. One end of the spindle is provided with a head, $a$, for attachment to the mandrel, shaft, or mechanism which imparts rotation thereto. The other end is screw-threaded, as at $b$, and a portion of the surface intermediate of its ends is tapering in two directions, as at $c\ c$, the narrowest diameters of the two tapering surfaces meeting, so that the greatest diameters are at the commencement and termination of the tapering portion.

C represents screw-cutting plates, which are fitted freely in openings in the chuck A. The cutting-faces of said plates project beyond the surface of the chuck, and their inner ends rest on the tapering portion of the spindle B. In the side of each plate C is a cavity, $d$, in which is inserted a coiled spring, D, which is passed through an opening in the chuck adjacent to the plate, and held in position by a screw, E, fitted to the threaded wall of said opening. Each screw E is formed with a stem, E', which passes through the coils of the spring, which projects into its respective cavity $d$, the latter being sufficiently deep to permit the required advancing and receding movements of the screw-cutting plate C; but the unlimited advance is restrained by the stem E', whereby said plate cannot be accidentally displaced.

To the end of the chuck A opposite to the head of the spindle there is swiveled a nut or sleeve, F, which has a central longitudinal opening, the wall whereof is threaded to engage with the threads $b$ of the spindle.

The swivel-connection of the sleeve and chuck is formed in the present case of a grooved neck or collar, $e$, on the chuck, which is encircled by the sleeve F and screws or studs G, which, passed through the sleeve, project into the groove of the neck or collar $e$, so as to connect the sleeve and neck, and consequently the chuck, without, however, interfering with the rotation of the sleeve on the chuck.

The diameter of the sleeve is less than that of the chuck, and consequently less than that of the socket or cap to be threaded, and in the circumference of the sleeve are openings $f$ for the insertion of pins or other implements for the purpose of holding the sleeve and preventing its rotation.

The operation is as follows: The sleeve F or the spindle B is rotated so that the sleeve occupies a position at or about the extreme end of the threaded portion of the spindle. The socket or other hollow body to be internally threaded in tapering directions is fitted over the chuck at the end opposite to the sleeve or other end, so that the screw-cutting plates will first reach the end of the socket that faces the sleeve, or vice versa, the socket being securely held. The sleeve is properly held by pins, clamps, or other appliances, so as to be deprived of rotation on the spindle, and power is communicated to the spindle. Owing to the feather or spline connection of the spindle and chuck, the threaded connection of the sleeve and spindle, and the swivel-connection of the sleeve and chuck, the chuck rotates and the sleeve and chuck travel on the spindle, whereby the screw-cutting plates cut into the socket, thus forming the threads.

As the screw-cutting plates are in contact with the tapering portions $c\ c$, it is evident that said plates are caused to follow the contour of said portions, whereby they first cut the widest diameter of the threaded portion of the socket, and as they enter the chuck to a greater extent, owing to the decreasing diameter of the tapering portion of the spindle on which they ride, the diameter of the threaded face of the socket is gradually reduced until the screw-cutting plates reach the increasing portion of the taper surfaces $c$, when they are gradually forced out, whereby the diameter of the threaded face of the socket is gradually increased. When the threading is complete the socket is at the end of the chuck opposite to which it entered, so that it may be readily removed.

It will be seen that the threaded face of the socket is tapering in both directions from the center to ends, the advantage of which for coupling pipes, &c., is well known.

When the sleeve is released the spindle, chuck, and sleeve may rotate as one, in which case the screw-plates do not advance and recede, so that ordinary cylindrical threading may be accomplished, or by proper manipulation of the sleeve a surface may be threaded, partly tapering and partly cylindrical, or other variable threading be performed.

I am aware that it is not new to provide a chuck with a spindle having a tapering surface, by which the taps may be adjusted to the diameters of cylindrical shapes or sockets of different sizes; but I am not aware of any chuck so constructed that it both travels on and rotates with the spindle, and the screw-cutting plates move in and out as they ride over the tapering surfaces, thus producing variable threads on the same socket.

Having fully described my invention, I claim as new—

A spindle provided with tapering surfaces and a threaded portion, in combination with a chuck, screw-cutting plates, and a swiveled nut, substantially as described, whereby the chuck rotates with and travels on the spindle and the screw-cutting plates advance and recede as the chuck moves, substantially as and for the purpose set forth.

BENJAMIN STOTT.

Witnesses:
  A. P. FIELDS,
  H. E. MILLER.